(12) United States Patent
Sridhar et al.

(10) Patent No.: US 11,900,260 B2
(45) Date of Patent: Feb. 13, 2024

(54) METHODS, DEVICES AND MEDIA PROVIDING AN INTEGRATED TEACHER-STUDENT SYSTEM

(71) Applicants: Deepak Sridhar, Richmond Hill (CA); Juwei Lu, North York (CA)

(72) Inventors: Deepak Sridhar, Richmond Hill (CA); Juwei Lu, North York (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 904 days.

(21) Appl. No.: 16/810,524

(22) Filed: Mar. 5, 2020

(65) Prior Publication Data
US 2021/0279595 A1    Sep. 9, 2021

(51) Int. Cl.
*G06N 3/08* (2023.01)
*G06N 3/088* (2023.01)
*G06N 3/045* (2023.01)

(52) U.S. Cl.
CPC .............. *G06N 3/088* (2013.01); *G06N 3/045* (2023.01); *G06N 3/08* (2013.01)

(58) Field of Classification Search
CPC ......... G06V 10/82; G06N 3/08; G06N 3/0454
See application file for complete search history.

(56) References Cited

U.S. PATENT DOCUMENTS

2016/0078339 A1* 3/2016 Li ........................... G06N 3/045
706/20
2018/0268292 A1* 9/2018 Choi ..................... G06V 10/454

FOREIGN PATENT DOCUMENTS

CN    108830813 A    11/2018
CN    110175627 A    8/2019

OTHER PUBLICATIONS

Li, et al. "Positional Normalization," 33rd Conference on Neural Information Processing Systems (NeurIPS 2019). (Year: 2019).*
Linfeng Zhang, Jiebo Song, Anni Gao, Jingwei Chen, Chenglong Bao, and Kaisheng Ma. Be your own teacher: Improve the performance of convolutional neural networks via self distillation. In arXiv preprint:1905.08094, 2019 2019.
Linfeng Zhang and Zhanhong Tan and Jiebo Song and Jingwei Chen and Chenglong Bao and Kaisheng Ma. Scan: A Scalable Neural Networks Framework towards Compact and Efficient Models In arXiv preprint: 1906.03951, 2019 2019.
Seyed-Iman Mirzadeh and Mehrdad Farajtabar and Ang Li and Nir Levine and Akihiro Matsukawa and Hassan Ghasemzadeh. Improved Knowledge Distillation via Teacher Assistant In arXiv preprint: 1902.0339, 2019 2019.

(Continued)

*Primary Examiner* — Feng-Tzer Tzeng

(57) ABSTRACT

Methods, devices and processor-readable media for an integrated teacher-student machine learning system. One or more teacher-student modules are trained as part of the teacher neural network training. Each student sub-network uses a portion of the teacher neural network to generate an intermediate feature map, then provides the intermediate feature map to a student sub-network to generate inferences. The student sub-network may use a feature enhancement block to map the intermediate feature map to a subsequent feature map. A compression block may be used to compress intermediate feature map data for transmission in some embodiments.

20 Claims, 12 Drawing Sheets

(56) References Cited

OTHER PUBLICATIONS

Geoffrey Hinton, Oriol Vinyals and Jeff Dean. Distilling the Knowledge in a Neural Network, https://arxiv.org/abs/1503.02531 Mar. 9, 2015.
Boyi Li, Felix Wu, Kilian Q. Weinberger, and Serge Belongie. Positional Normalization, https://arxiv.org/pdf/1907.04312.pdf Dec. 19, 2019.
Adriana Romero et al, Fitnets: Hints for Thin Deep Nets, Published as a conference paper at ICLR 2015, Mar. 27, 2015, 13 pages.

* cited by examiner

METHODS, DEVICES AND MEDIA PROVIDING AN INTEGRATED TEACHER-STUDENT SYSTEM

TECHNICAL FIELD

The present disclosure generally relates to knowledge distillation, and in particular to methods, devices and processor readable media providing an integrated teacher-student system trained using knowledge distillation.

BACKGROUND

Machine Learning (ML) is an artificial intelligence technique in which algorithms are used to build a model from sample data that is capable of being applied to input data to perform a specific inference task (i.e., making predictions or decisions based on new data) without being explicitly programmed to perform the specific inference task. Neural networks are used to build a model has been in a training stage, the trained model can be extremely computationally intensive to operate on a hardware device to perform the inference task, as the model typically includes a large number of parameters that have been learned during a training stage. Accordingly, researchers have explored various techniques for simplifying or compressing the built model to generate a less computationally-intensive model having fewer learned parameters than the constructed model but with comparable performance as the built model.

Knowledge Distillation (KD) is a compression technique used to transfer the knowledge of a bigger neural network (i.e. with many learned parameters) to a smaller neural network (i.e. with fewer learned parameters). KD utilizes the generalization ability of the larger neural network (referred to as the "teacher network") using the inference data output by the larger neural network as "soft targets", which are used as a supervision signal for training a smaller model (called the "student sub-network"). This technique stands in contrast to conventional training of a neural network, in which "hard targets" corresponding to the ground truth reflected in labelled training data are used as the sole supervision signal to train the neural network to build a model.

In KD, the student sub-network receives both soft targets and hard targets as supervision signals. This allows the student model to be trained using a smaller training dataset, as the soft targets provide higher entropy and less variance (i.e. better generalization) than the hard targets. For KD to be effective, the smaller neural network needs to be designed with an appropriate architecture, and the teacher network must be trained independently of the student sub-network. KD thus necessarily results in a mismatch between the student sub-network and teacher network and limits the knowledge transfer from the two networks. Moreover, the teacher network does not benefit from improvements in the performance of the student sub-network during training, as the knowledge transfer path is one-way (from teacher network to student sub-network).

A generalized technique for knowledge distillation is described by Geoffrey Hinton, Oriol Vinyals and Jeff Dean in *Distilling the Knowledge in a Neural Network*, https://arxiv.org/abs/1503.02531, which is hereby incorporated by reference in its entirety. Other applicable knowledge distillation teachings can be found in Linfeng Zhang, Jiebo Song, Anni Gao, Jingwei Chen, Chenglong Bao, and Kaisheng Ma, *Be your own teacher: Improve the performance of convolutional neural networks via self distillation*, arXiv preprint: 1905.08094, 2019; Linfeng Zhang, Zhanhong Tan, Jiebo Song, Jingwei Chen, Chenglong Bao and Kaisheng Ma, SCAN: *A Scalable Neural Networks Framework towards Compact and Efficient Models*, arXiv preprint: 1906.03951, 2019; and Seyed-Iman Mirzadeh, Mehrdad Farajtabar, Ang Li, Nir Levine, Akihiro Matsukawa and Hassan Ghasemzadeh, *Improved Knowledge Distillation via Teacher Assistant*, arXiv preprint: 1902.0339, 2019, each of which is hereby incorporated by reference in its entirety.

A typical architecture 10 for conventional KD is shown in FIG. 1A. A large teacher network 20 is used to train a smaller student sub-network 30. The teacher network 20 generates teacher inference data 24 based on the input data 22. The teacher inference data 24 is used as a soft target for supervision of the student sub-network 30 and inform a loss function applied to the student inference data 34 based on the same inputs 22 as the teacher network.

SUMMARY

The present disclosure provides methods, devices and processor readable media providing an integrated teacher-student system trained using knowledge distillation. In some embodiments, one or more student neural sub-networks are trained as part of the teacher neural network training. Each student neural sub-network uses a portion of the teacher neural network, referred to as a teacher sub-network, to generate an intermediate feature map, then provides the intermediate feature map to a student sub-network to generate inferences. The student sub-network generates inferences using a smaller number of learned parameters than the teacher network. This allows the student sub-models to be operated on less computationally-intensive platforms than the teacher network, either independently or as part of an ensemble inference system with other student neural networks and/or the entire teacher neural network.

In some embodiments, the student sub-network may include a feature enhancement block. The feature enhancement block uses a feature enhancement sub-network to map the intermediate feature map to a subsequent feature map (i.e., a higher-order feature map corresponding to features identified closer to the output of the teacher model than the intermediate feature map). By training the feature enhancement sub-network to perform non-linear mapping of the intermediate feature map to the subsequent feature map, the two feature maps can be fused.

To enable compressed data between the parts of such an ensemble inference system and potentially reduce latency, a compression block may be used to compress intermediate feature map data for transmission in some embodiments.

Example embodiments are directed to a first method. A first teacher sub-network of a neural network of an integrated system is operated in an inference mode to generate a first intermediate feature map based on an inference-mode data input received by the integrated system. A first student sub-network of the integrated system is operated in the inference mode to generate student inference data based on the first intermediate feature map. The first student sub-network has been trained, operating in a training mode, using subsequent inference data provided as a supervision signal, the subsequent inference data being generated by a subsequent sub-network of the integrated system.

According to a further aspect which can be combined with other embodiments disclosed herein, the method further comprises using a first processor to operate a prior teacher sub-network in the inference mode to generate a prior intermediate feature map based on the inference-mode data input, and provide compressed data based on the prior intermediate feature map. The compressed data is received at a second processor, the second processor being used to operate the first teacher sub-network and the first student sub-network in the inference mode.

According to a further aspect which can be combined with other embodiments disclosed herein, the compressed data is provided by generating positional normalization data based on the prior intermediate feature map, down-sampling the prior intermediate feature map to generate an embedding vector, and the compressed data is generated based on the positional normalization data and the embedding vector.

According to a further aspect which can be combined with other embodiments disclosed herein, the first teacher sub-network comprises one or more layers of the teacher neural network.

According to a further aspect which can be combined with other embodiments disclosed herein, the first student sub-network comprises a feature enhancement sub-network, and the feature enhancement sub-network has been trained, operating in a training mode, to perform a non-linear mapping between its input and output using penultimate feature map data provided by a subsequent teacher sub-network of the integrated system as a supervision signal.

According to a further aspect which can be combined with other embodiments disclosed herein, the first intermediate feature map comprises a first intermediate feature map matrix. Generating student inference data comprises generating as output an output feature map matrix based on the first intermediate feature map matrix, the output feature map matrix having different matrix dimensions than the first intermediate feature map matrix, and generating student inference data based on the output feature map matrix.

According to a further aspect which can be combined with other embodiments disclosed herein, the feature enhancement sub-network generates the output feature map matrix by applying at least one convolution operation, at least one down-sampling operation, and at least one concatenation operation to the first intermediate feature map matrix.

Other example embodiments are directed to a second method. A feature map is received. Positional normalization data is generated based on the feature map. The feature map is down-sampled to generate an embedding vector. Compressed data is generated based on the positional normalization data and the embedding vector. The compressed data is transmitted over a communication link.

According to a further aspect which can be combined with other embodiments disclosed herein, the feature map is generated by a first processor operating a prior teacher sub-network of a neural network. The method further comprises receiving the compressed data over the communication link at a second processor, and using the second processor to operate a first sub-network of the neural network to generate inference data based on the compressed data.

According to a further aspect which can be combined with other embodiments disclosed herein, the prior sub-network of the machine learning model comprises a first layer of the neural network. The first sub-network of the machine learning model comprises a second layer of the neural network.

Other example embodiments are directed to a third method. An integrated system is provided. The integrated system comprises a teacher neural network comprising, in series, a first teacher sub-network adapted to generate a first intermediate feature map based on a training-mode data input to the teacher neural network, and a final teacher sub-network adapted to generate teacher inference data based on the first intermediate feature map. The integrated system further comprises a first student sub-network adapted to generate first student inference data based on the first intermediate feature map. The method further comprises training the integrated system. The training-mode data input is propagated forward through the teacher neural network to generate the first intermediate feature map and teacher inference data. The first intermediate feature map is propagated forward through the first student sub-network to generate first student inference data. A first knowledge distillation loss is calculated based on a knowledge distillation loss function applied to the first student inference data and the teacher inference data. The first knowledge distillation loss is propagated backward through the first student sub-network and the first teacher sub-network to train the first student sub-network and the first teacher sub-network.

According to a further aspect which can be combined with other embodiments disclosed herein, the teacher neural network further comprises, in series prior to the first teacher sub-network, a prior teacher sub-network adapted to generate a prior intermediate feature map based on the training-mode data input. The integrated system further comprises a prior student sub-network adapted to generate prior student inference data based on the prior intermediate feature map. Training the integrated system further comprises propagating the prior intermediate feature map forward through the prior student sub-network to generate prior student inference data, calculating a prior knowledge distillation loss based on a knowledge distillation loss function applied to the prior student inference data and the first student inference data, and propagating the prior knowledge distillation loss backward through the prior student sub-network and the prior teacher sub-network to train the prior student sub-network and the prior teacher sub-network.

According to a further aspect which can be combined with other embodiments disclosed herein, the method further comprises, after the teacher neural network and the first student sub-network have been trained, jointly operating the first teacher sub-network and the first student sub-network in an inference mode to perform an inference task.

According to a further aspect which can be combined with other embodiments disclosed herein, the final teacher sub-network is further adapted to generate a penultimate feature map based on the first intermediate feature map. The method further comprises providing a first feature enhancement sub-network as part of the first student sub-network, and training the first feature enhancement sub-network by propagating the first intermediate feature map forward through the first feature enhancement sub-network to generate a first student feature map, calculating a feature enhancement loss based on the penultimate feature map compared to the first student feature map, and propagating the feature enhancement loss backward through the first feature enhancement sub-network to train the first feature enhancement sub-network.

Other example embodiments are directed to a device. The device has a processor, and a memory having stored thereon instructions for carrying out the method steps described above.

According to a further aspect which can be combined with other embodiments disclosed herein, the device further comprises a communication link.

According to a further aspect which can be combined with other embodiments disclosed herein, there is provided a non-transitory processor-readable medium containing instructions executable by a processor to carry out the method steps above.

In some such embodiments, the method or device may exhibit various advantages over known techniques. Some embodiments may address the problem of achieving distributed inference across multiple platforms through shared computations using a single teacher-student model. Some embodiments may enable a single model teacher-student training paradigm for inference on different platforms. Some embodiments may improve the feature representations of the student sub-networks in self-distillation frameworks. Some embodiments may enable sharing computation across multiple inference platforms to eliminate redundant computation and achieve faster inference with privacy protection.

BRIEF DESCRIPTION OF THE DRAWINGS

Embodiments will now be described by way of examples with reference to the accompanying drawings, in which like reference numerals may be used to indicate similar features.

DESCRIPTION OF EXAMPLE EMBODIMENTS

Figure 1A:
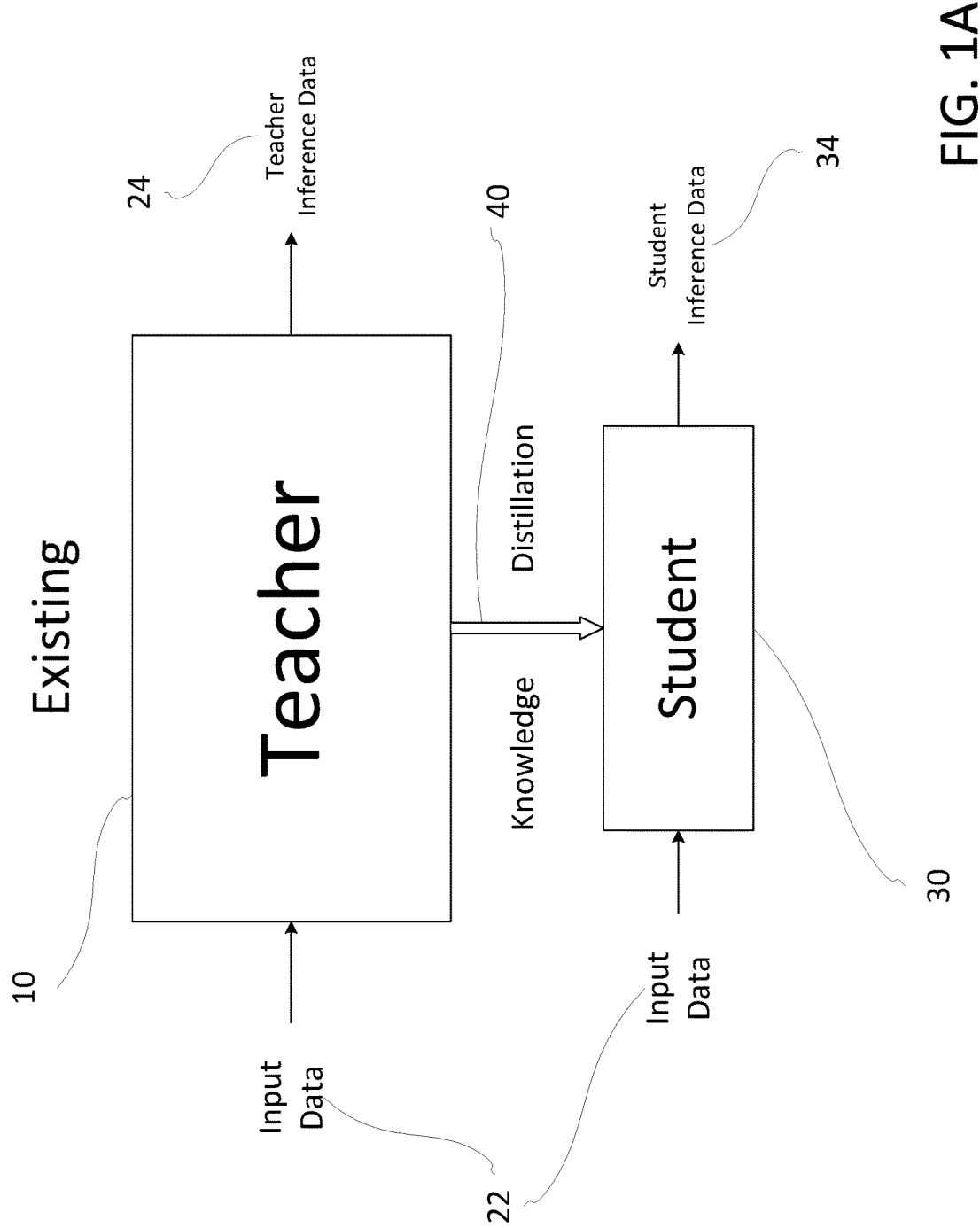
FIG. 1A is a block diagram showing conventional knowledge distillation between a teacher network and a student sub-network.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Example embodiments will now be described with respect to methods, devices, and non-transitory media providing an integrated teacher-student machine learning system. The training of the teacher and student models will be described, as well as the operation of the teacher model and/or student sub-models of the integrated system in an inference mode to perform inference tasks. A feature enhancement block included in the student models will be described in detail. A compression block included in the teacher model will also be described in detail.

Neural Networks

As used herein, "neural network" refers to an executable computational structure, such as processor-executable software instructions, that can be executed in a training mode to learn a model to perform a particular inference task. Once the neural network has been trained, it can be operated in an inference mode to perform the inference task. The neural networks described herein shall be described as convolutional neural networks configured to perform a particular inference task relating to input data, such as image data representative of digital images. Examples of inference tasks include classification, an object detection, or a segmentation task. However, it will be appreciated that various embodiments described herein may be equally applicable to other inference tasks, other neural network (such as fully connected or recurrent neural networks), with appropriate changes to certain operations such as the specific loss functions used for knowledge distillation. For example, the techniques described herein could be applied to language inference tasks using Long Short-Term Memory (LSTM), Gated Recurrent Units (GRUs), or Bidirectional Encoder Representations from Transformers (BERT), with corresponding changes to the loss function such as the use of Kullback-Leibler (KL) divergence. Furthermore, some of the embodiments described herein may have applications outside of the neural network context: certain embodiments of the compression block could be generally applicable to compression of multi-dimensional image data, and certain embodiments of the feature enhancement block could be generally applicable to non-linear mapping between two data maps having different data dimensions.

Integrated Teacher-Student System

Example embodiments will now be described with reference to an integrated teacher-student system (or "integrated system") 100 in FIG. 1B. The integrated system 100 includes multiple integrated teacher-student modules 104. As described below with reference to FIG. 3, each integrated teacher-student module 104 comprises a portion of the teacher network 102, and a student sub-network.

Inference tasks may be performed by the teacher network 102 and by each teacher-student network 104. The teacher network 102 performs the inference task using a relatively large model having many learned parameters, and its output is teacher inference data 108. Each teacher-student network 104 performs the inference task using a relatively smaller model having fewer learned parameters than the teacher network 102, and the output of each teacher-student network 104 is student inference data 322, 324, 326, 328. In some embodiments, each successively lower-numbered teacher-student network 104 has a smaller number of parameters, i.e. TS1 122 has fewer parameters than TS2 124, and so on.

The number of teacher-student modules 104 may be more or fewer than four in different embodiments.

Figure 3A:
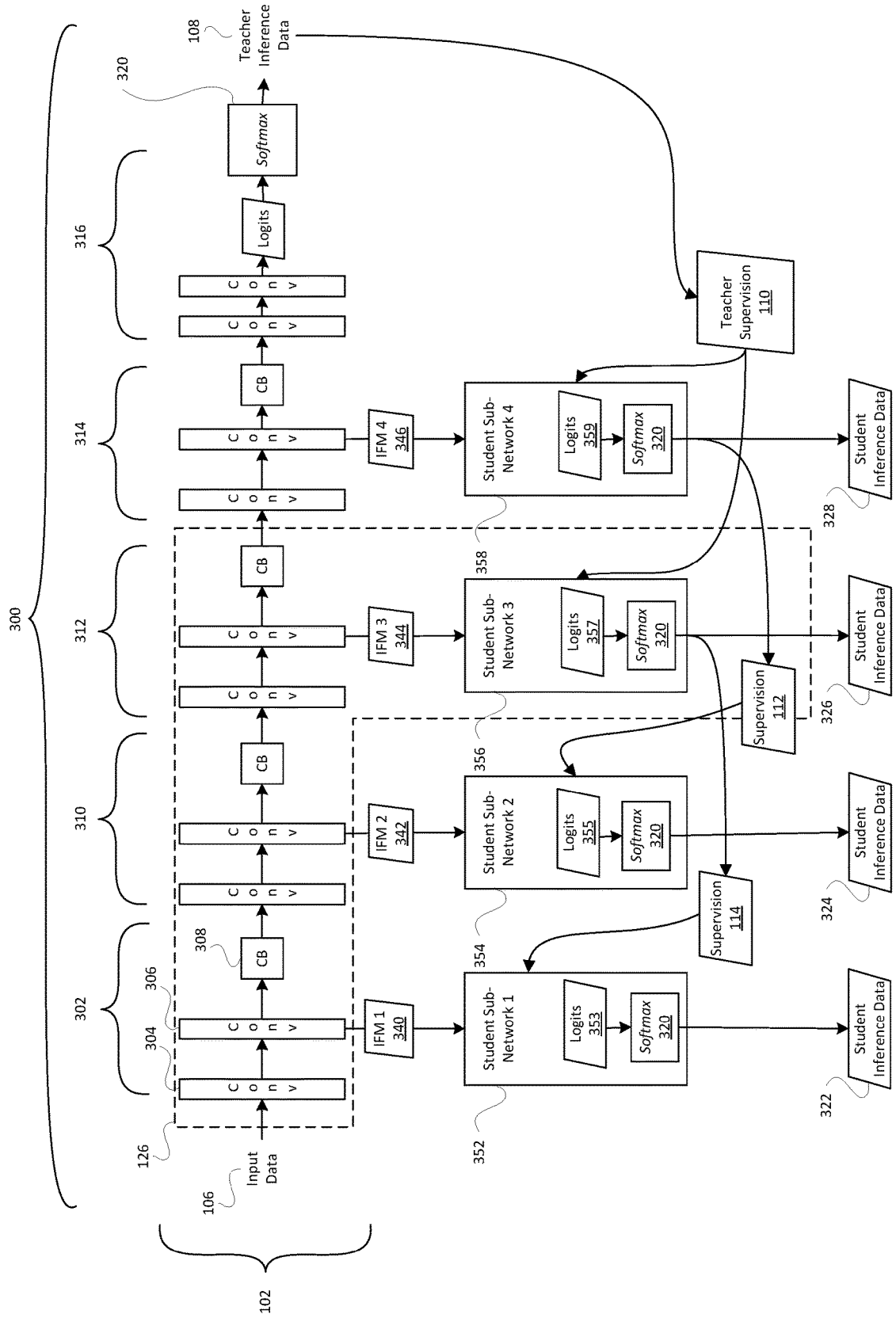
FIG. 3A is a detailed block diagram of the integrated teacher-student system of FIG. 1B according to example embodiments described herein.

With reference to FIG. 3A, a more detailed block diagram of a first example integrated system ("first integrated system") 300 is shown. The first integrated system 300 includes a teacher network 102 consisting of a plurality of teacher sub-networks: an initial teacher sub-network 302 that receives input data 106, a first intermediate teacher v 310, a second intermediate teacher sub-network 312, a third intermediate teacher sub-network 314, and a final teacher sub-network 314 that generates teacher inference data 108. In some embodiments, the input data 106 comprises image data and the teacher inference data 108 comprises predicted or inferred probabilities for an inference task relating to the input data 106.

The first integrated system 300 also includes a plurality of student sub-networks: Student sub-network 1 352 that receives Intermediate Feature Map 1 340 from the initial teacher sub-network 302; Student sub-network 2 354 that receives Intermediate Feature Map 2 342 from the first intermediate teacher sub-network 310; Student sub-network 3 356 that receives Intermediate Feature Map 3 344 from the second intermediate teacher sub-network 312; and Student sub-network 4 358 that receives Intermediate Feature Map 4 346 from the third intermediate teacher sub-network 314.

Figure 1B:
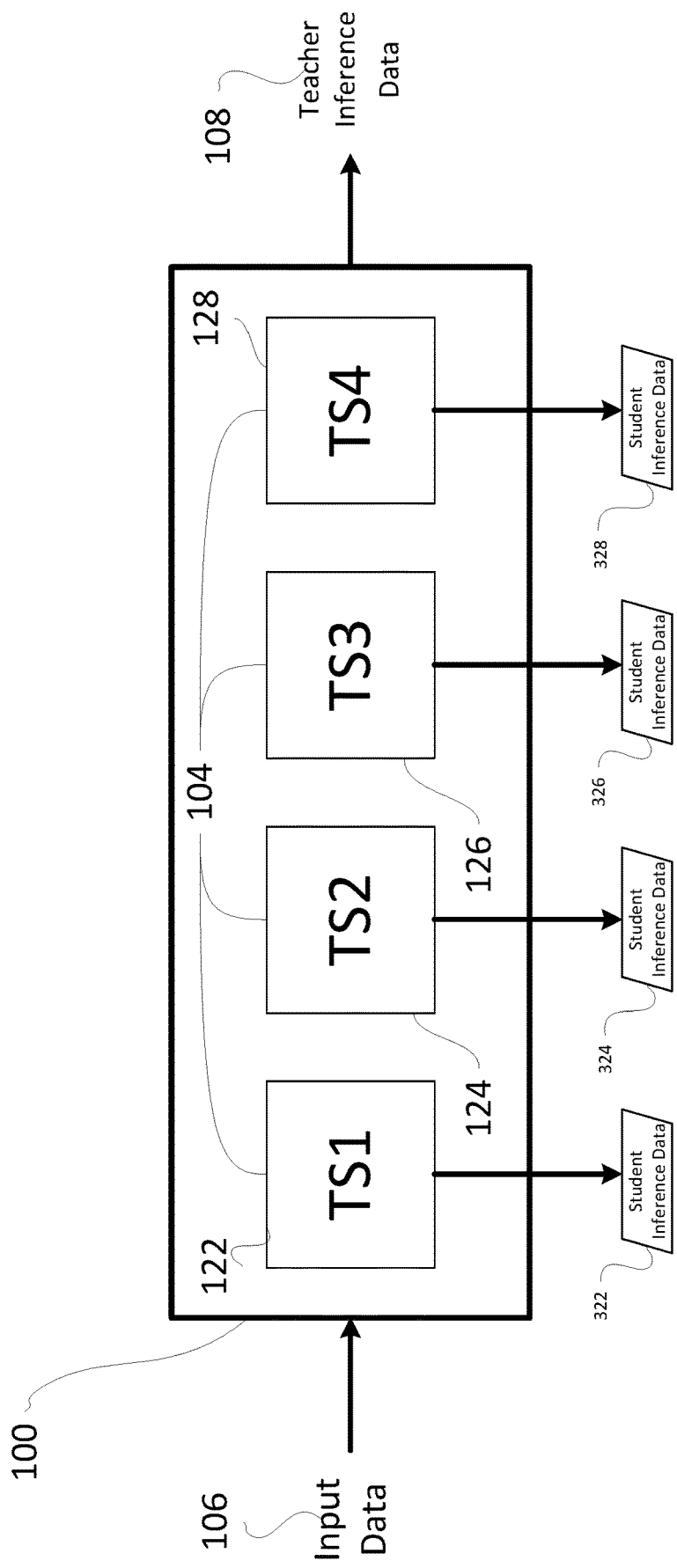
FIG. 1B is a block diagram showing an integrated teacher-student system comprising a plurality of integrated teacher-student modules according to example embodiments described herein.

The first integrated system 300 comprises a plurality of integrated teacher-student modules 104 as identified in FIG. 1B. Each integrated teacher-student module includes one or more teacher sub-networks and a student sub-network. Outlined in a dashed line is third integrated teacher-student sub-network 126, corresponding to TS3 126 from FIG. 1B, and comprising the initial teacher sub-network 302, first intermediate teacher sub-network 310, second intermediate teacher sub-network 312, and Student sub-network 3 356. The other integrated teacher-student modules (not identified in the drawing to preserve clarity) are a first integrated teacher-student module comprising 302 and 352; a second integrated teacher-student module comprising 302, 310 and 354; and a fourth integrated teacher-student module comprising 302, 310, 312, 314 and 358.

Figure 3B:
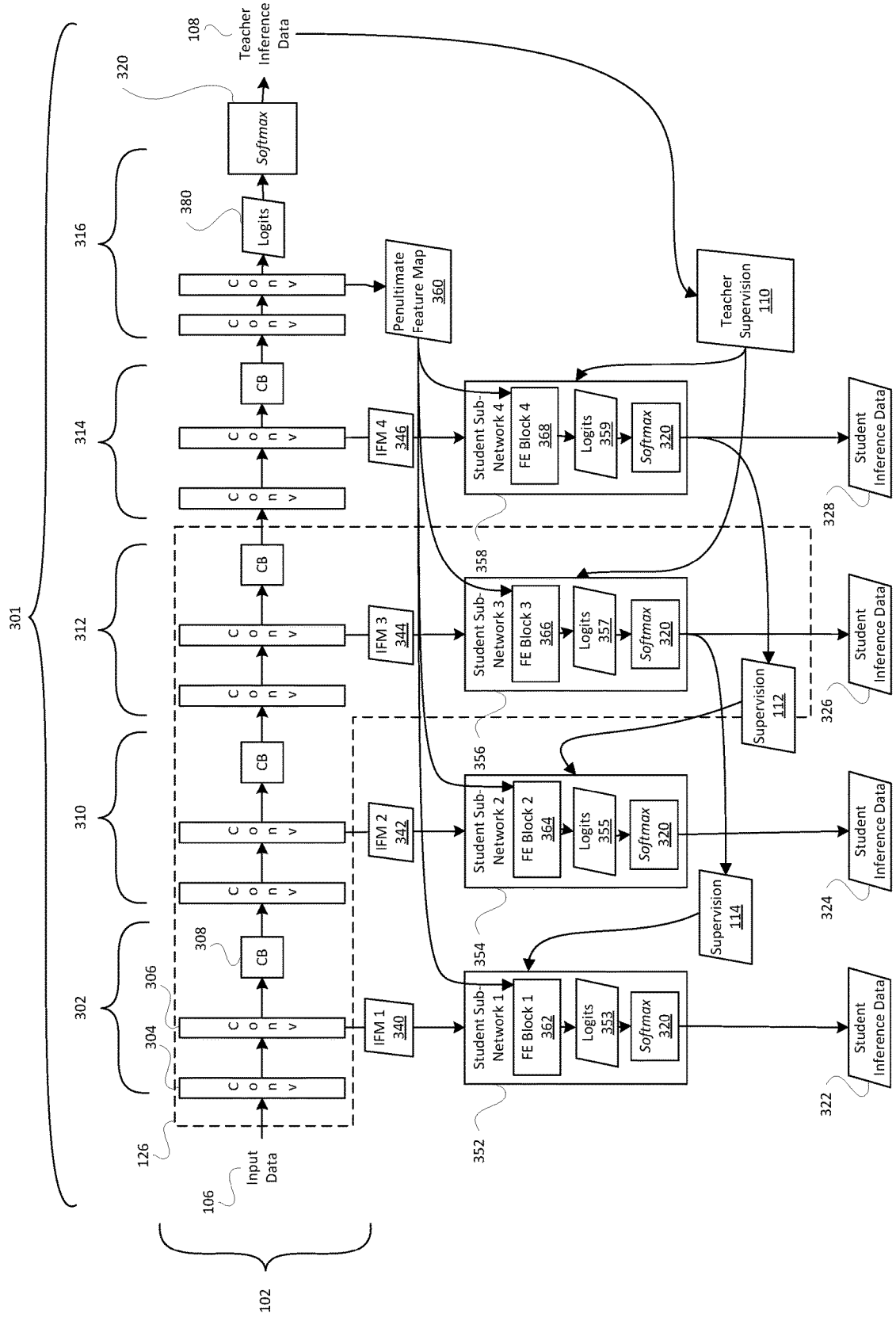
FIG. 3B is an alternative detailed block diagram of the integrated teacher-student system of FIG. 1B using feature enhancement according to example embodiments described herein.

As used with reference to the arrangement of teacher sub-networks and student sub-networks such as those shown in FIG. 3A or FIG. 3B, the terms "prior", "subsequent", and other temporal or spatial terms as described in the Convolutional Neural Networks section may take on further specialized meanings. Relative to a first portion of the first integrated system 300, the term "prior" may denote a component or operation that occurs closer to the input data 106, while the term "subsequent" may refer to a component or operation that occurs closer to the teacher inference data 108. In the case of a student sub-network such as student sub-network 2 354, "prior" or a similar term may also refer to a upstream (measured along the length of the teacher network 102) student sub-network such as student sub-network 1 352 or to an upstream teacher sub-network such as initial teacher sub-network 302 or first intermediate teacher sub-network 310, and "subsequent" or a similar term may also refer to a downstream (measured along the length of the teacher network 102) student sub-network such as student sub-network 3 356 or to a subsequent teacher sub-network such as second intermediate teacher sub-network 312.

In this example embodiment, each teacher sub-network other than the final teacher sub-network 314 includes the same functional blocks: a first convolution block 304, a second convolution block 306, and a compression block 308. The operation of the convolution blocks 304, 306 is known to a person skilled in the art. The operation of the compression block 308 is described in detail below in the section on Compression. In some embodiments, the number of convolution blocks in each teacher sub-network may be different from two. Each teacher sub-network corresponds to a portion of the teacher network 102, such as one or more layers of a neural network or one or more functional blocks carrying out a part of a machine learning or inference process. The compression block 308 may be omitted in some embodiments.

The final teacher sub-network 314 does not use a compression block 308. Instead, the teacher inference data 108 of the teacher network 102 is generated by applying a softmax function 320 to the output of the second convolution block 306 (or a final convolution block or layer of the teacher network).

The intermediate feature maps 340, 342, 344, 346 are generated by the second convolution block 306 of each respective teacher sub-network 302, 310, 312, 314. These intermediate feature maps 340, 342, 344, 346 are received by their respective student sub-networks 352, 354, 356, 358 as input data. Each student sub-network 352, 354, 356, 358 includes one or more convolution blocks such that the student sub-networks 352, 354, 356, 358 can be trained to generate inference data based on the feature map 340, 342, 344, 346 received as input data. Each student sub-network thus operates as a smaller alternative to the subsequent teacher sub-networks that it bypasses: for example, student sub-network 1 352 can be trained to generate inference data using essentially the same input as the series of teacher sub-networks it bypasses, namely the first intermediate teacher sub-network 310 through the final teacher sub-network 316. When student sub-network 1 352 is operated jointly with initial teacher sub-network 302 as the integrated teacher-student module TS1 122, the integrated teacher-student module includes a neural network with a smaller network (i.e. with fewer parameters) than the teacher network 102. The neural network included in the integrated teacher-student module TS2 124 is somewhat larger than the neural network included in the integrated teacher-student module S1 122 due to its reliance on two teacher sub-networks 302, 310. And this trend continues through integrated teacher-student module S4 128, which includes the largest neural network of the integrated teacher-student modules 104, relying on four teacher sub-networks 302, 310, 312, 314. In some embodiments, however, integrated teacher-student module TS4 128 is still smaller than the teacher network 102 as a whole due to a smaller number of learned parameters being used in student sub-network 4 358 than in the final teacher sub-network 316.

Each student sub-network 352, 354, 356, 358 generates student logits 353, 355, 357, 359 which have a softmax function 320 applied to them to generate student inference data 322, 324, 326, 328. As used herein, terms such as "inference data", "teacher inference data", and "student inference data" may be used to describe either the logits generated by logits function, or the output of the softmax function applied to the logits.

When operating in a training mode, as described in further detail in the training section below, the integrated system 300 uses a cascade of supervision signals as described with respect to FIG. 2B in the Training section below. Teacher inference data 108 generated by the final teacher sub-network 316 is used as teacher supervision signal 110, providing a soft target for knowledge distillation training of student sub-network 4 358 and student sub-network 3 356. The student inference data 328 generated by student sub-network 4 358 is provided as a TS4 supervision signal 112 to student sub-network 2 354. The TS3 student inference data 326 produced by student sub-network 3 356 is provided as a TS3 supervision signal 114 to student sub-network 1 352. The data provided to the teacher network 102 as input data 106 is labelled training data, which also provides ground truth labels as hard targets to each student network 352, 354, 356, 358 as well as to the teacher network 102 itself. These supervision signals, alone or in combination with others, are used by the integrated system 300 to train each teacher-student module 104 as well as the teacher network 102 as described below in the Training section.

With reference to FIG. 3B, a second example integrated system ("second integrated system") 301 is shown. The structure and operation of the second integrated system 301 are largely similar to those of the first integrated system 300. However, in the second integrated system 301, each student network includes a feature enhancement (FE) block: FE block 1 362, FE block 2 364, FE block 3 366, and FE block 4 368. Each FE block 362, 364, 366, 368 operates to fuse its respective intermediate feature map 340, 342, 344, 346 with a penultimate feature map 360 provided by a penultimate layer of the final teacher module 316, providing a non-linear mapping of the intermediate feature map 340, 342, 344, 346 to the penultimate feature map 360. In a convolutional neural network implementation such as the second integrated system 301, the penultimate feature map 360 is the output of the layer directly before a final logits layer of the teacher network 102, the teacher logits 380 being the input to the final softmax function 320 before the teacher inference data 108. The operation of the feature enhancement block is described in detail in the Feature Enhancement section below.

Figure 4:
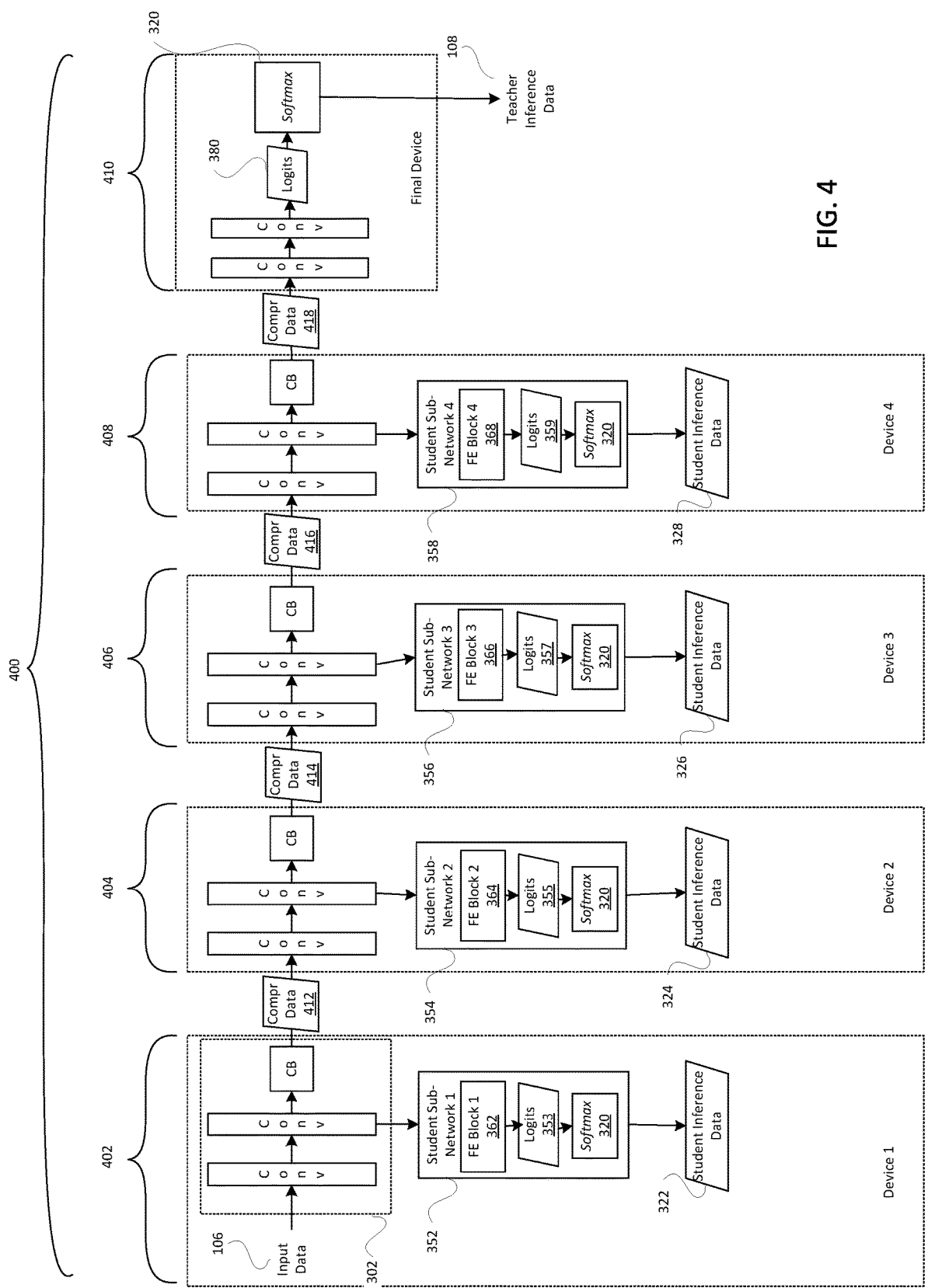
FIG. 4 is a detailed block diagram of the integrated teacher-student system of FIG. 3B operating on a plurality of platforms as an ensemble inference system according to example embodiments described herein.

In some embodiments, the trained teacher-student modules 104 may be operated across multiple devices or platforms as an ensemble inference system. With reference to FIG. 4, an example ensemble inference system 400 is shown operating on five different devices 402, 404, 406, 408, 410 that each implement a portion of the second integrated system 301. In some embodiments, each device 402, 404, 406, 408, 410 may constitute a separate hardware device as described in the Device section below. In other embodiments, each device 402, 404, 406, 408, 410 may be implemented as a separate virtual device, a separate instance on a cloud computing platform, a separate processor within a multi-processor device, or some combination of the aforementioned. The devices 402, 404, 406, 408, 410 are in communication with each other by communication links, which may be some combination of wired or wireless network communication interfaces, internal data buses, and so on.

The illustrated ensemble inference system 400 includes a first device 402 operating the initial teacher module 302 and student module 1 352 to generate first student inference data 322. The compression block 308 of the initial teacher module 302 generates first compressed data 412 for transmission across a communication link from the first device 402 to a second device 404. The second device 404 similarly includes the first intermediate teacher module 310 and student module 2 354, with a compression block 308 generating second compressed data 414 to a third device 406. The third device 406 includes the second intermediate teacher module 312 and student module 3 356 and generates third compressed data 416 to a fourth device 408. The fourth device 408 includes the third intermediate teacher module 314 and student module 4 358 and generates fourth compressed data 418 to a final device 410. The final device 410 includes the final teacher module 316.

In some embodiments, the second integrated system 301 is trained in training mode on a single platform (such as a single cloud computing platform or a single computer) before being segmented and installed on the five devices 402, 404, 406, 408, 410 to operate in an inference mode. In inference mode, the ensemble prediction system 400 is able to generate teacher inference data 108 and/or student inference data 322, 324, 326, 328 at one or more of the devices depending on how many of the devices are operating and accessible by the communication links of the other devices. In a first example scenario, a user of the second device 404 (e.g. a mobile device) may be in communication with the first device 402 only. In this case, teacher-student module TS2 124 could be implemented by the first device 402 and second device 404 in communication with each other, generating second student inference data 324 at the second device 404. In a second scenario in which the use of the second device 404 is also in communication with the third device 406, fourth device 408, and final device 410, the user could access the second student inference data 324 and then wait for the teacher inference data 108 to be generated and communicated from the final device 410 (e.g. a cloud server) to the second device 404 to enhance or confirm the second student inference data 324.

Spreading the computation across multiple platforms or devices may provide several advantages. It may allow more effective pipelining, as each student module performs its computation in parallel with subsequent teacher modules on subsequent devices. It allows each device to be tasked with operating a set of modules or sub-networks suited to its computational power. It may also enable redundancy and flexibility in the event that one or more devices in the ensemble inference system 400 is unavailable or unreachable by another device.

In some cases, the bottleneck of ensemble systems is the communication links between the devices. Modern hardware often provides for massively parallel computing suited to neural networks and other parallel computing structures, but communication links between devices are limited in their parallel throughput. This can introduce latency into an inference task performed by an ensemble system. In some embodiments, the ensemble inference system 400 uses the compression block 308 of each device 402, 404, 406, 408, 410 to compress the feature map data generated by one teacher module and used as input by the next, as described below in the Compression section. This compression may fully or partly address the data bottleneck at communication links between teacher sub-networks.

Feature Enhancement

Feature enhancement (FE) blocks may be used in place of, or as part of, the student sub-networks described above in the Integrated Teacher-Student Model section. A feature enhancement block may be used to learn the low resolution, abstract features used for classification tasks. The feature enhancement block mimics the features of the penultimate feature map 360 of the teacher network 102 and thereby improves the feature representations of its respective teacher-student module 104.

The intermediate feature maps 340, 342, 344, 346 of the teacher network 102 used as input to the student sub-networks may represent low-level features (such as lines, edges, blobs, etc. in the context of image-related inference tasks), whereas high-level abstract features are required for many inference tasks. To improve the feature representations of the teacher-student modules 104, the coarser level features from the upstream layers are fused to the fine features at the downstream layers of the teacher network 102. The fusion is performed in a top-down and bottom-up fashion using a feature enhancement block as shown in FIG. 6.

Figure 6:
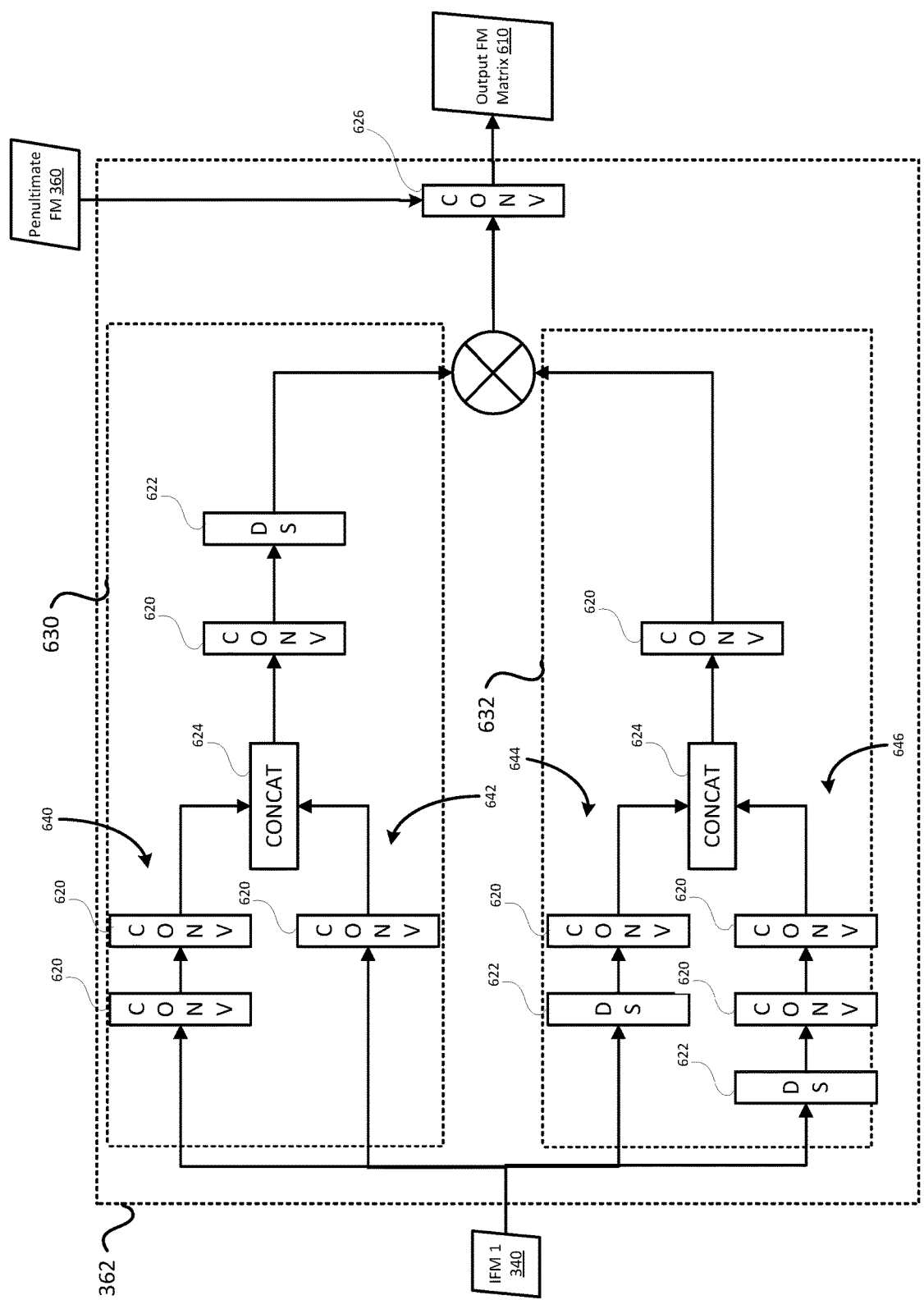
FIG. 6 is a block diagram of a feature enhancement block according to example embodiments described herein.

With reference to FIG. 6, a block diagram of first feature enhancement block 362 of the second integrated system 301 is shown. The first feature enhancement block 362 comprises a feature enhancement sub-network 600 having a plurality of convolution blocks 620. The first feature enhancement block 362 receives intermediate feature map 1 340 as input.

Since the feature maps of the teacher network 102 and teacher-student modules 104 may differ in spatial dimensions, the intermediate feature map may be fused with the penultimate feature map 360 in bottom-up or top-down fashion to learn the highly nonlinear mapping. Performing both top-down and bottom-up fusion allows the student sub-networks to learn rich feature representations.

Intermediate feature map 1 340 is used as input to each of four different sub-branches: first sub-branch 640, second sub-branch 642, third sub-branch 644, and fourth sub-branch 646. The first sub-branch 640 and second sub-branch 642 together constitute a top-down branch 630, while the third sub-branch 644 and fourth sub-branch 646 together constitute a bottom-up branch 630. Within the top-down branch 630, the first sub-branch 640 operates top-down relative to the bottom-up operation of the second sub-branch 642; within the bottom-up branch 630, the third sub-branch 644 operates top-down relative to the bottom-up operation of the fourth sub-branch 646.

The third sub-branch 644 and fourth sub-branch 646 down-sample their respective input feature maps using a down-sampling operation 622.

Each of the four sub-branches 640,642,644,646 includes one or more convolution blocks 620. Each pair of sub-branches concatenates its output using a concatenation operation 624, passing the concatenated result to a further convolution block 620. In the top-down branch 630, this output is then down-sampled by a down-sampling operation 622.

The outputs of the top-down branch 630 and bottom-up branch 632 are thus both of the same resolution, as each has had a single down-sampling operation 622 applied to it. The outputs of the top-down branch 630 and bottom-up branch 632 are combined and passed to a final convolution block 626. The final concatenation block 626 produces an output feature map matrix 610 as its output. The data dimensions of the output feature map matrix 610 are the same as those of the penultimate feature map 360, allowing the output feature map matrix 610 to be fed to a final layer to generate a set of student logits 353 for the first teacher-student module TS1 122.

When operating in training mode, the penultimate feature map 360 is used to provide a supervision signal for the feature enhancement sub-network 600. A loss function, such as an L2 (least square error) loss function, is used to compare the penultimate feature map 360 to the output feature map matrix 610 and provide a feature enhancement loss calculation for back-propagation backward through the convolution blocks 620 of the feature enhancement sub-network 600.

In some embodiments, the feature enhancement sub-network 600 requires only a small number of learned parameters, since the number of channels is greatly reduced. In some embodiments, an FE block may add only few thousand Floating Point Operations (FLOPS). Training using the penultimate feature map 360 removes the dependency on the penultimate feature map 360 during inference mode. This assists the smaller student sub-models 104 in performing inference tasks independently of the teacher model 102.

In some embodiments, the down-sampling operation 622 may be a simple bilinear down-sampling used for resizing operations in images. In some embodiments, the concatenation operation 624 may concatenate along the channel dimensions of the input data. It will be appreciated that other specific down-sampling operations 622 or concatenation operations 624 in other embodiments.

In essence, the feature enhancement machine learning model 600 learns a non-linear mapping between two feature maps (e.g. intermediate feature map 1 340 and the penultimate feature map 360). The feature enhancement machine learning model 600 may be used independently of an integrated system 100, 300, 301 and hence can be plugged into any model or application that needs to learn a highly non-linear mapping function.

Training

Each of the described example integrated systems 100, 300, 301 may be operated in a training mode using some combination of conventional training of the teacher network 102 (referred to herein as "pre-training") and knowledge distillation to train the teacher-student modules 104. The second integrated system 301 may further train the feature enhancement sub-networks 600 used by its FE blocks 362, 364, 366, 368 using a penultimate feature map 360 as described above in the Feature Enhancement section.

Figure 2A:
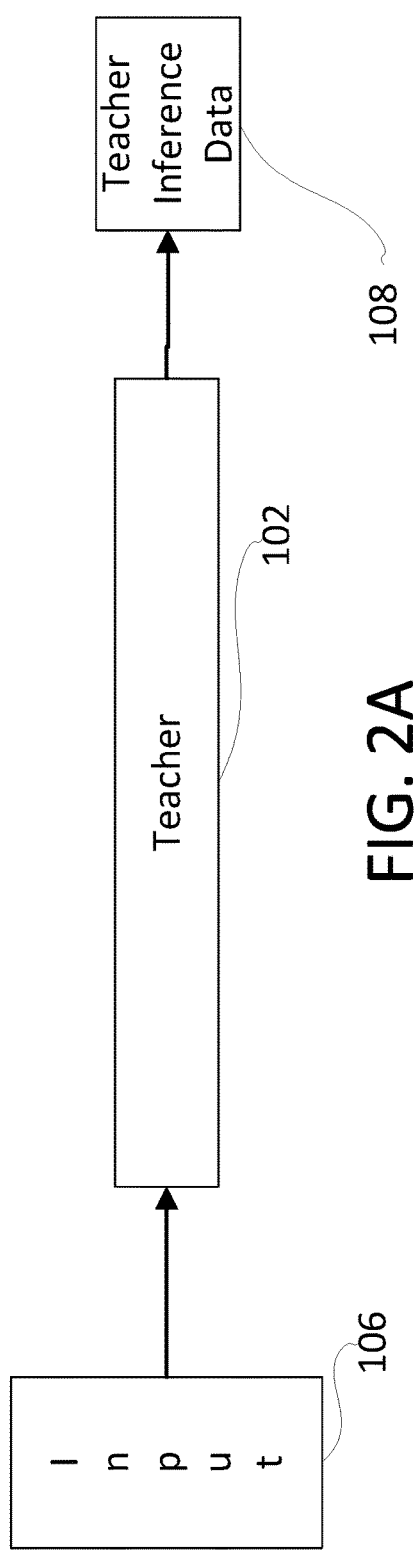
FIG. 2A is a block diagram of the teacher network according to example embodiments described herein.

With reference to FIG. 2A, in a first training or pre-training step, the teacher network 102 is trained conventionally using a training dataset that includes a plurality of training samples, each training sample being labelled training data. The training sample in the training dataset is provided as input data 106, and the teacher network 102 generates teacher inference data 108 based on the input data 106 (e.g., the training sample). The ground truth label associated with each respective training sample in the training dataset is used as a hard target by a loss function that calculates a loss between the generated teacher inference data 108 and the ground truth label, which is back-propagated through the teacher network 102 to adjust the parameters of the neural network (e.g. weights of the neural network).

The pre-training of the teacher network 102 can be used before a knowledge distillation step is performed in some embodiments to avoid using the output of an untrained teacher network 102 in initial knowledge distillation iterations. In other embodiments, the teacher-student modules 104 can be trained using knowledge distillation without pre-training the teacher network 102, allowing the teacher network 102 to be trained at the same time as the teacher-student modules 104 are being trained using KD.

Figure 2B:
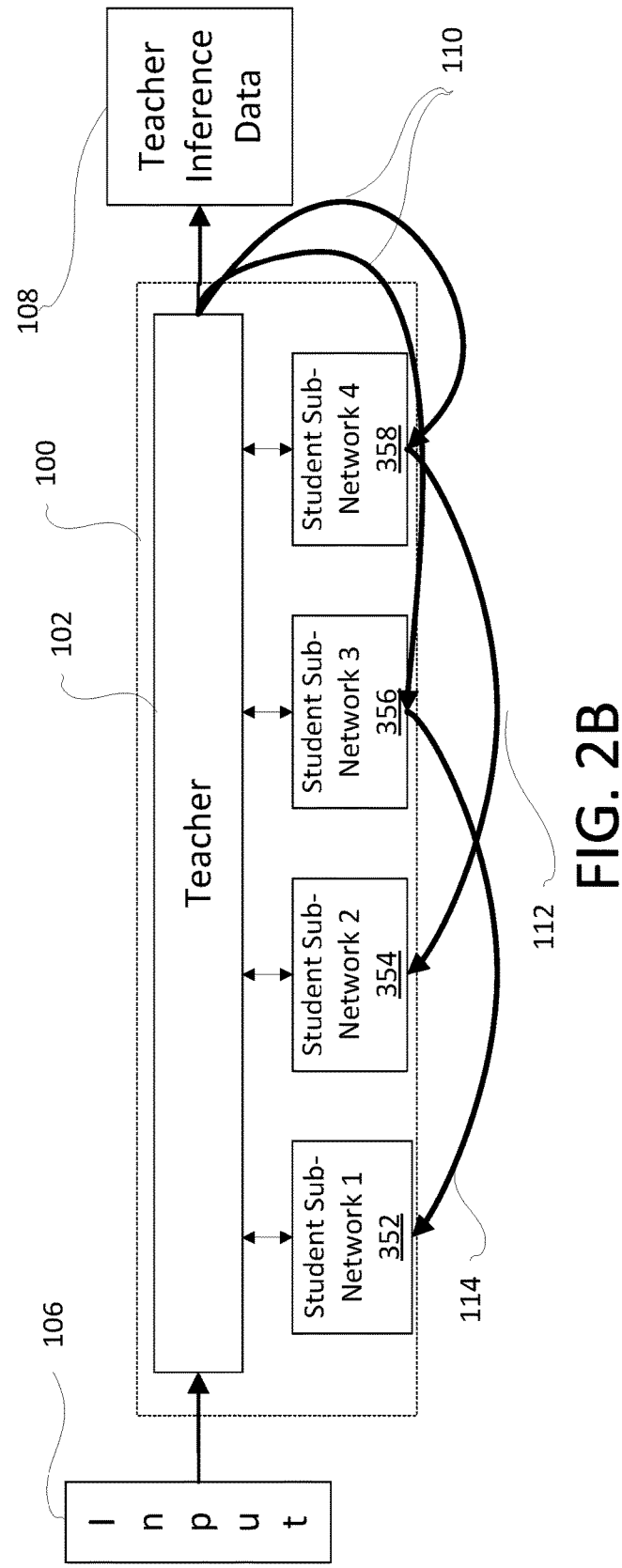
FIG. 2B is a block diagram of a system that includes the teacher network of 2A integrated with a plurality of student sub-networks of FIG. 1B during training of the system according to example embodiments described herein.

With reference to FIG. 2B, a second training step or knowledge distillation (KD) step is shown. The teacher network 102 continues to be trained conventionally using the labelled training data. The training data is provided as input data 106, and the teacher network 102 generates teacher inference data 108. The ground truth labels of the training data are used as hard targets for the teacher as described above. During this step, the teacher-student modules 104 are also trained using the ground truth labels, with a loss function calculating a student loss for back-propagation through the teacher-student module 104, starting at the student sub-network 322, 324, 326, 328 and propagating back through all its upstream teacher sub-networks. Thus, in training the third teacher-student module TS3 126, a loss function is applied to the logits generated by student sub-network 3 356 (i.e. the basis for third student inference data 326) and the final teacher network 102 logits 380 to calculate a third student loss. This third student loss is back-propagated through the convolution blocks or layers of student sub-network 3 356 and then through the convolution blocks or layers of second intermediate teacher sub-network 312, first intermediate teacher sub-network 310, and initial teacher sub-network 302.

Also during this step, the teacher-student modules undergo knowledge distillation training using soft targets. The integrated system 100 uses a cascading training framework whereby the high-level, downstream teacher-student modules 104 (such as TS3 126 and TS4 128) are trained using the teacher inference data 108 generated by the teacher network 102 based on input data 106 received by the teacher network 102, and the outputs of these downstream teacher-student modules 104 are used to train upstream teacher-student modules 104 (such as TS1 122 and TS2 124). In the example illustrated in FIG. 2B, the teacher supervision signal 110 is determined based on the teacher inference data 108 and is fed to student sub-network 4 358 and student sub-network 3 356 to supervise TS4 128 and TS3 126 respectively. Lower-level, upstream teacher-student modules 104 are supervised by their next-to-immediate downstream neighbor, i.e. TS1 122 is trained using a TS3 supervision signal 114 (fed to student sub-network 1 352) based on the output of TS3 126, while TS2 124 is trained by a TS4 supervision signal 112 (fed to student sub-network 2 354) based on the output of TS4 128. The cascading knowledge distillation training graph shown in FIG. 2B means that TS3 126 and TS4 128 are trained using the final teacher logits 380 as teacher supervision signal 110. A KD loss function is applied to the teacher supervision signal 110 and the student logits 357 generated by TS3 126 to calculate a KD loss for TS3 126, and applied to the teacher supervision signal 110 and the student logits 359 generated by TS4 128 to calculate a KD loss for TS4 128.

The hierarchical knowledge distillation training techniques described herein act as cyclic feedback for both teacher and student sub-networks. As the training progresses, better teacher outputs may lead to better student outputs and vice-versa. This cyclic feedback can continue until the model reaches its capacity (i.e. gradient flow becomes zero or negligible).

Knowledge distillation may be most effective when a meta parameter called temperature has a value and the value of the meta parameter (e.g. the temperature value) is used in calculating probability inferences at the teacher-student modules 104 and the teacher network 102. In some embodiments performing classification inference tasks, the probability $p_i$ of class i may be calculated as:

$$p_i = \frac{e\left(\frac{x_i}{T}\right)}{\sum_j e\left(\frac{x_j}{T}\right)}$$

where $x_i$ is the teacher logits 380 and T is the meta parameter called temperature. The teacher logits 380 are scaled by temperature T, where T=1 it is the normal softmax output. Using a higher value for T produces a softer or flatter probability distribution over classes, with no class having a probability close to zero. In such embodiments, the overall loss function incorporating student loss and distillation loss may be calculated as:

$$L(x;W) = \alpha * H(y, \sigma(z_s; T=1)) + \beta * H(\sigma(z_t; T=\tau), \sigma(z_s, T=\tau))$$

where x is the input data 106 (i.e. a training sample); W are the teacher-student module 104 parameters, y is the ground truth label from the training sample used as input data 106, H is the cross-entropy loss function, σ is the softmax function 320 parameterized by the temperature T, and α and β are coefficients. $Z_t$ is the teacher logits 380 and $z_s$ is student logits 353, 355, 357, or 359.

It will be appreciated that training of the teacher-student modules 104 may use alternative or additional loss functions and/or supervision signals. Temperature T may be decreased over the course of training as the network becomes more accurate and training needs to be more fine-tuned. The distillation loss function defined above incorporates the softmax function 320 applied to the logits 353, 355, 357, 359 generated by the teacher-student modules 104 and the teacher logits 380 scaled by temperature, so different embodiments may use the logits themselves as supervision signals instead of the teacher inference data 108 or student inference data 322, 324, 326, 328; the loss function may be formulated accordingly.

In some embodiments, the supervisions signals 110, 112, 114 used to train the teacher-student modules 104 may be based on intermediate data generated by the teacher network 102 and/or downstream teacher-student modules 104, such as intermediate feature map data generated between layers or modules of the teacher model and/or teacher-student modules 104. Some embodiments may supervise the teacher-student modules 104 using alternative or additional supervision signals. Some embodiments additionally use the hard targets derived from labelled training data as supervision signals to the teacher-student modules 104, as is conventionally done in knowledge distillation. Some embodiments may use the teacher supervision signal 110 to directly supervise all teacher-student modules 104 instead of just the downstream teacher-student modules 104. Some embodiments may use a densely-connected supervision graph instead of the cascading graph shown in FIG. 3, with each teacher-student module 104 being supervised by all downstream teacher-student modules 104 (i.e., TS2 would be supervised using the teacher supervision signal 110 as well as the TS4 supervision signal 112 and the TS3 supervision signal 114).

Compression

As described in the Integrated Teacher-Student System section above, the communication links between the devices 402, 404, 406, 408, 410 act as a bottleneck for distributed or ensemble inference systems. The compression block 308 may be used as part of an integrated system to effect efficient compression of the intermediate feature maps in the integrated system. In some embodiments, the intermediate feature maps are compressed by the compression block 308 as low-dimensional embedding vectors that can be easily synchronized across devices for shared computations.

In integrated systems using compression blocks 308 to communicate between devices (and therefore between teacher sub-networks), each teacher-student module 104 has two outputs: the output of the softmax function 320 and the compressed data (e.g. first compressed data 412) generated by the compression block 308. In some embodiments, the softmax output is highly accurate, while the compressed data is low-dimensional for data transfer. The compression block may in some embodiments be an n-dimensional embedding layer (where n depends on a compression ratio) that holds the compressed feature maps.

Figure 5:
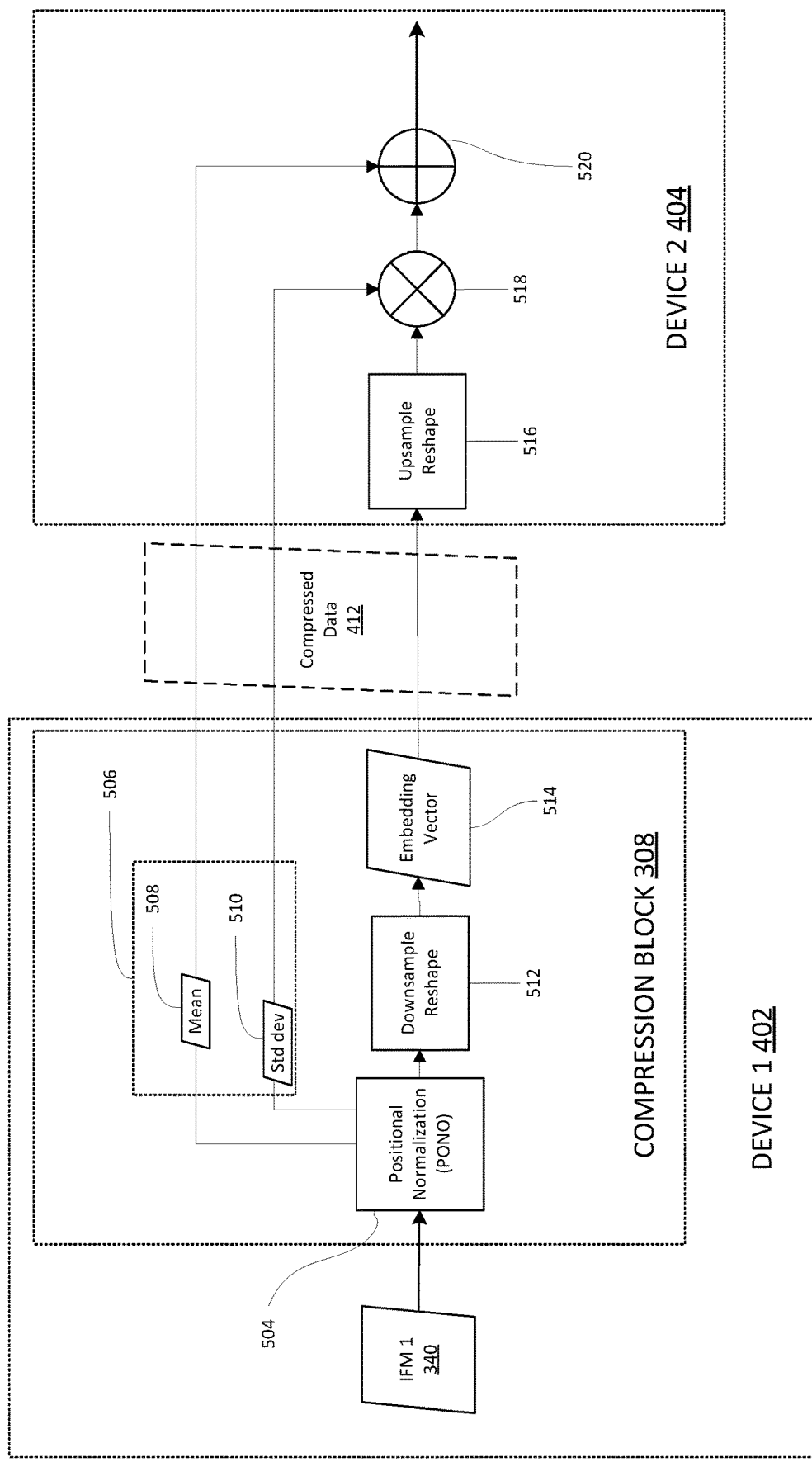
FIG. 5 is a block diagram of a compression block according to example embodiments described herein.

With reference to FIG. 5, example compression block 308 is shown operating on first device 402 and communicating over a communication link with second device 404. The operation of the compression block 308 is described with respect to an image-related inference task using image input data.

Intermediate feature map 1 340, of dimensions NHWC (batch size×pixel height×pixel weight×number of channels), is provided to the compression block 308 as input. Intermediate feature map 1 340 undergoes a position normalization (PONO) operation 504. Positional normalization is described by Boyi Li, Felix Wu, Kilian Q. Weinberger, and Serge Belongie in Positional Normalization, https://arxiv.org/pdf/1907.04312.pdf, which is hereby incorporated by reference in its entirety. The PONO block 504 generates position normalization data 506 by normalizing intermediate feature map 1 340 along the channel dimension to obtain the per-pixel position statistics. The position normalization data 506 comprises the per-pixel position statistics, namely mean data 508 and standard deviation data 510, each of shape NHW (batch size×pixel height×pixel width).

After the position normalization operation 504, intermediate feature map 1 340 undergoes a down-sampling and reshaping operation 512 to obtain a feature embedding vector (shown as embedding vector 514) of size $r^{-2}$NHWC where r is a compression ratio. The effective size of the embedding vector 512 in this example is $r^{-2}$NHWC+2NHW=NHW($r^{-2}$C+2).

The compression block 308 then generate compressed data 412 based on the embedding vector 512 and the position normalization data 506.

The compressed data 412 is transmitted across the communication link to second device 404. On the second device 404, the embedding vector 512 is extracted from the compressed data 412 before undergoing an up-sampling and reshaping operation 516. The up-sampled vector is combined with the standard deviation data 510 of the position normalization data 506 by a multiplier operation 518, and the output of that combination is further combined with the mean data 508 of the position normalization data 506 by an additive operation 520.

Device

Figure 7:
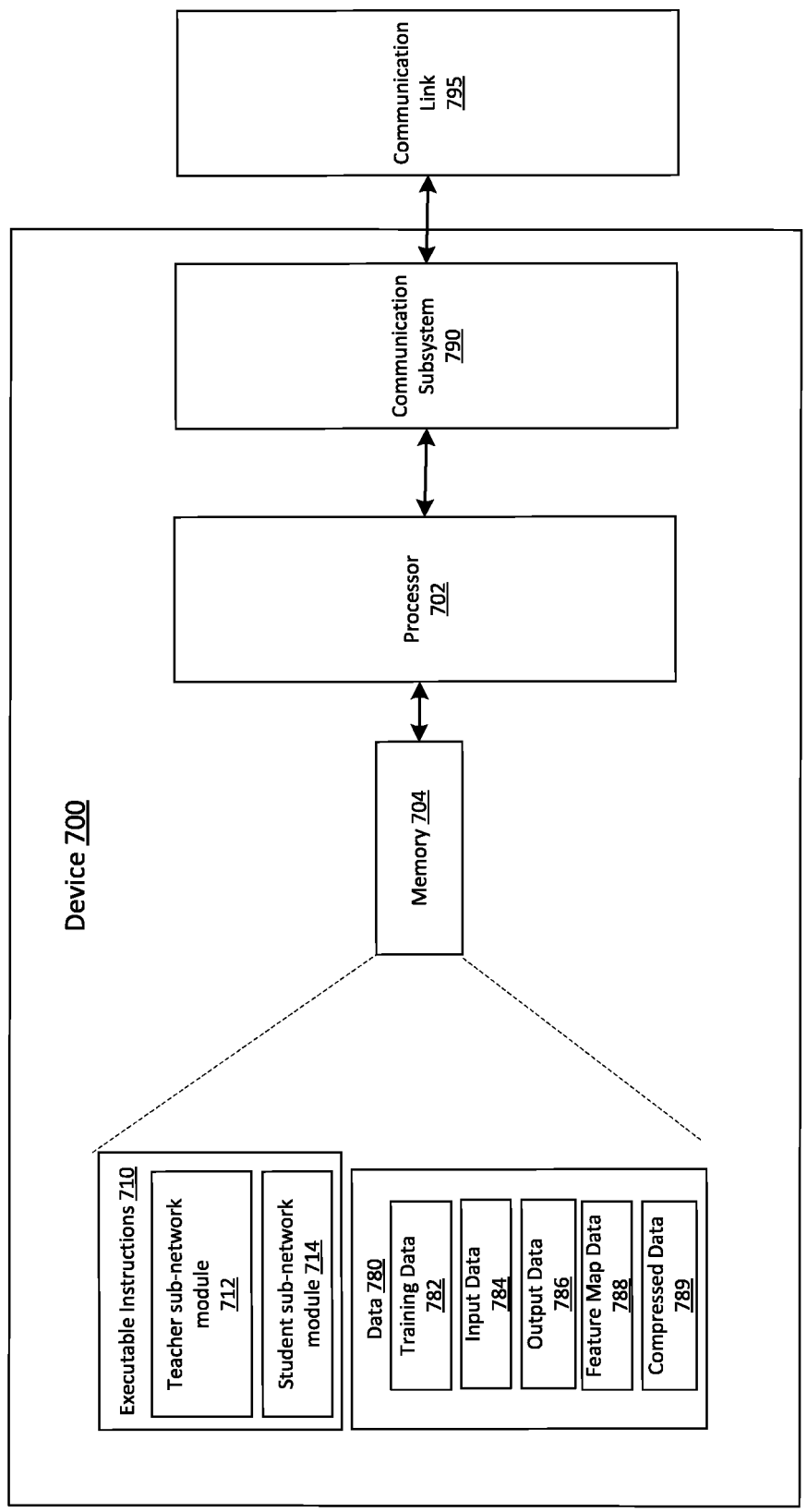
FIG. 7 is a block diagram of a device according to example embodiments described herein.

The various integrated systems 100, 300, 301, feature enhancement blocks, and compression blocks 308 described herein may be implemented using any of a number of computing platforms or devices, such as devices 402, 404, 406, 408, 410 shown in FIG. 4. With reference to FIG. 7, an example device 700 is shown in simplified block diagram format. In some embodiments, the device 700 may be used as a platform for training the integrated system 100, 300, 301 as described in the Training section above. In some embodiments, the device 700 may be one of the five devices 402, 404, 406, 408, 410 used to operate the ensemble inference system 400 shown in FIG. 4 in inference mode. In some embodiments, the device 700 may be used to operate a stand-alone teacher-student module 104 in inference mode: for example, a device 700 configured to operate teacher-student module TS2 124 has installed in its memory instructions for operating initial teacher sub-network 302, first intermediate teacher sub-network 310, and student sub-network 2 354. Any of the neural networks or sub-networks operating in training mode or inference mode, and any of the feature enhancement blocks, compression blocks, or other functional blocks or operations described herein may be operated by a device 700 as shown in FIG. 7. The device 700 includes a processor 702 for executing computer program instructions, and a memory 704 for storing executable instructions and data.

The processor 702 may be embodied as any processing resource capable of executing computer program instructions, such as one or more processors on a computer or computing platform(s). The memory 704 may be embodied as any data storage resource, such as one or more disk drives, random access memory, or volatile or non-volatile memory on one or more computing platforms.

The memory 704 has stored thereon several types of computer programs in the form of executable instructions. It has thereon a set of executable instructions 710 for carrying out the method steps and implementing the operations and functional blocks described herein. It also has stored thereon one or more sets of instructions for training neural networks and operating trained machine learning models or portions thereof to perform inference tasks, shown here as teacher sub-network module 712 and student sub-network module 714. The execution of the teacher sub-network module 712 and student sub-network module 714 may correspond to the training mode or operating mode of the teacher sub-networks 302, 310, 312, 314, 316 and student sub-networks 352, 354, 356, 358 of the integrated systems 100, 300, 301 described herein.

The memory 704 may have stored thereon several types of data 780. The data 780 may include labelled training data 782 using in training and pre-training, input data 784 used in inference mode as input data 106, and output data 786 generated by the integrated system 100, 300, 301 or portions thereof as teacher inference data 108 and/or student inference data 322, 324, 326, and/or 328. The data 780 may also include feature map data 788 and/or compressed data 789. In some embodiments, the data 780 may be received from an external source via a communication subsystem 790 communicating over a communication link 795, potentially being stored in part in a buffer or cache in the memory 704.

Methods

The operation of the various integrated systems 100, 300, 301, feature enhancement blocks 362, 364, 366, 368, and compression blocks 308 described herein shall now be described as methods with reference to the flowcharts of FIGS. 8-10.

Figure 8:
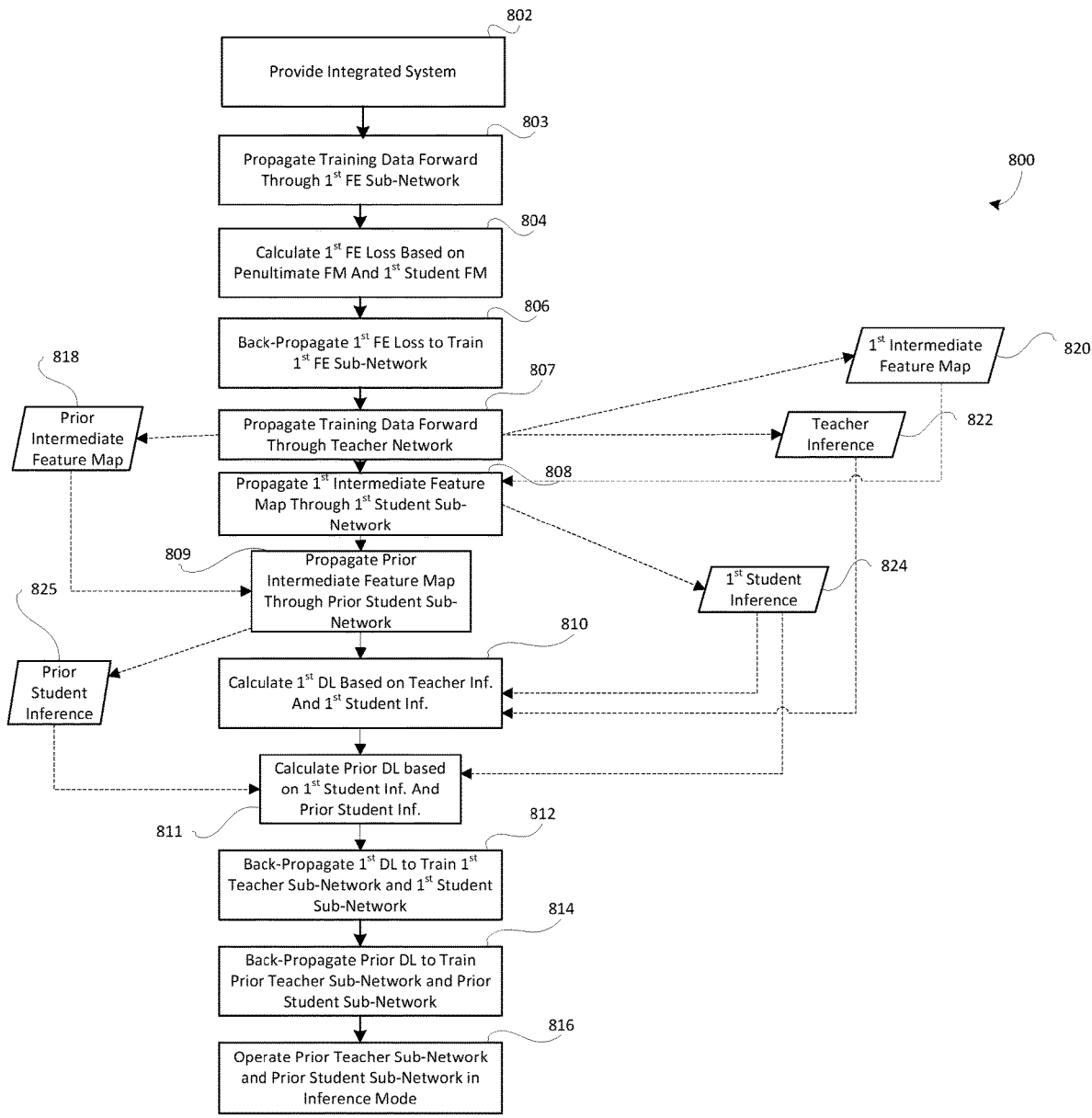
FIG. 8 is a flowchart of a first method for training the integrated teacher-student machine learning system of FIG. 1B, FIG. 2B, FIG. 3A, FIG. 3B, or FIG. 4 according to example embodiments described herein.

With reference to FIG. 8, a first method 800 for training and operating a portion of an integrated teacher-student system is shown. At step 802, an integrated teacher-student machine learning model (such as second integrated system 301) is provided. The integrated teacher-student machine learning model includes a teacher neural network (e.g. teacher network 102). The teacher network comprises, in series, a prior teacher sub-network, a first teacher sub-network, and a final teacher sub-network. Each teacher sub-network may be implemented by a teacher sub-network module 712 as described above in the Device section. The prior teacher sub-network (e.g. initial teacher sub-network 302) is adapted to generate a prior intermediate feature map (e.g. intermediate feature map 1 340) based on a training-mode data input to the teacher network (e.g. input data 106). The first teacher sub-network (e.g. second intermediate teacher sub-network 312) is adapted to generate a first intermediate feature map (e.g. intermediate feature map 3 344) based on the training-mode data input. The final teacher sub-network (e.g. final teacher sub-network 316) is adapted to generate teacher inference data (e.g. teacher inference data 108) based on the first intermediate feature map, and to generate a penultimate feature map (e.g. penultimate feature map 360) based on the first intermediate feature map (e.g. by propagating intermediate feature map 3 344 forward through the third intermediate teacher sub-network 314 and final teacher sub-network 316 to generate the penultimate feature map 360 using the penultimate layer of the second convolution block 306 of the final teacher sub-network 316).

The integrated teacher-student machine learning model also includes a prior student sub-network (e.g. first student sub-network 352) adapted to generate prior student inference data (e.g. first student inference data 322) based on the prior intermediate feature map. The integrated teacher-student machine learning model also includes a first student sub-network (e.g. third student sub-network 356) adapted to generate first student inference data (e.g. third student inference data 326) based on the first intermediate feature map. The first student sub-network includes a first feature enhancement sub-network (e.g. FE network 600 from third FE block 366). Each student sub-network, including each feature enhancement sub-network, may be implemented by a student sub-network module 714 as described above in the Device section.

At step 803, the first intermediate feature map is propagated forward through the first feature enhancement sub-network to generate a first student feature map (e.g. output feature map matrix 610 of third feature enhancement block 366).

At step 804, a feature enhancement loss (e.g. L2 loss from FIG. 6) is calculated based on the penultimate feature map compared to the first student feature map.

At step 806, the feature enhancement loss is propagated backward through the first feature enhancement sub-network to train the first feature enhancement sub-network.

At step 807, the training-mode data input is propagated forward through the teacher network to generate the first intermediate feature map and teacher inference data.

At step 808, the first intermediate feature map is propagated forward through the first student sub-network to generate the first student inference data.

At step 809, the prior intermediate feature map is propagated forward through the prior student sub-network to generate the prior student inference data.

At step 810, a first distillation loss is calculated based on a knowledge distillation loss function (e.g. the KD loss function described in the Training section above) applied to the first student inference data and the teacher inference data.

At step 811, a prior knowledge distillation loss is calculated based on a knowledge distillation loss function (e.g. the KD loss function described in the Training section above) applied to the prior student inference data and the first student inference data.

At step 812, the first knowledge distillation loss is propagated backward through the first student sub-network and the first teacher sub-network to train the first student sub-network and the first teacher sub-network.

At step 814, the prior knowledge distillation loss is propagated backward through the prior student sub-network and the prior teacher sub-network to train the prior student sub-network and the prior teacher sub-network.

At step 816, after the teacher network and the first student sub-network have been trained, the first teacher sub-network and the first student sub-network are jointly operated in an inference mode to perform an inference task. According to the examples given in the steps above, this would correspond to operating at least the third student sub-network 356 and second intermediate teacher sub-network 312 to perform the inference task. This would require the initial teacher module 302 and first intermediate teacher module 310 as well, on the same device or one or more separate devices, to complete the third teacher-student module TS3 126.

Figure 9:
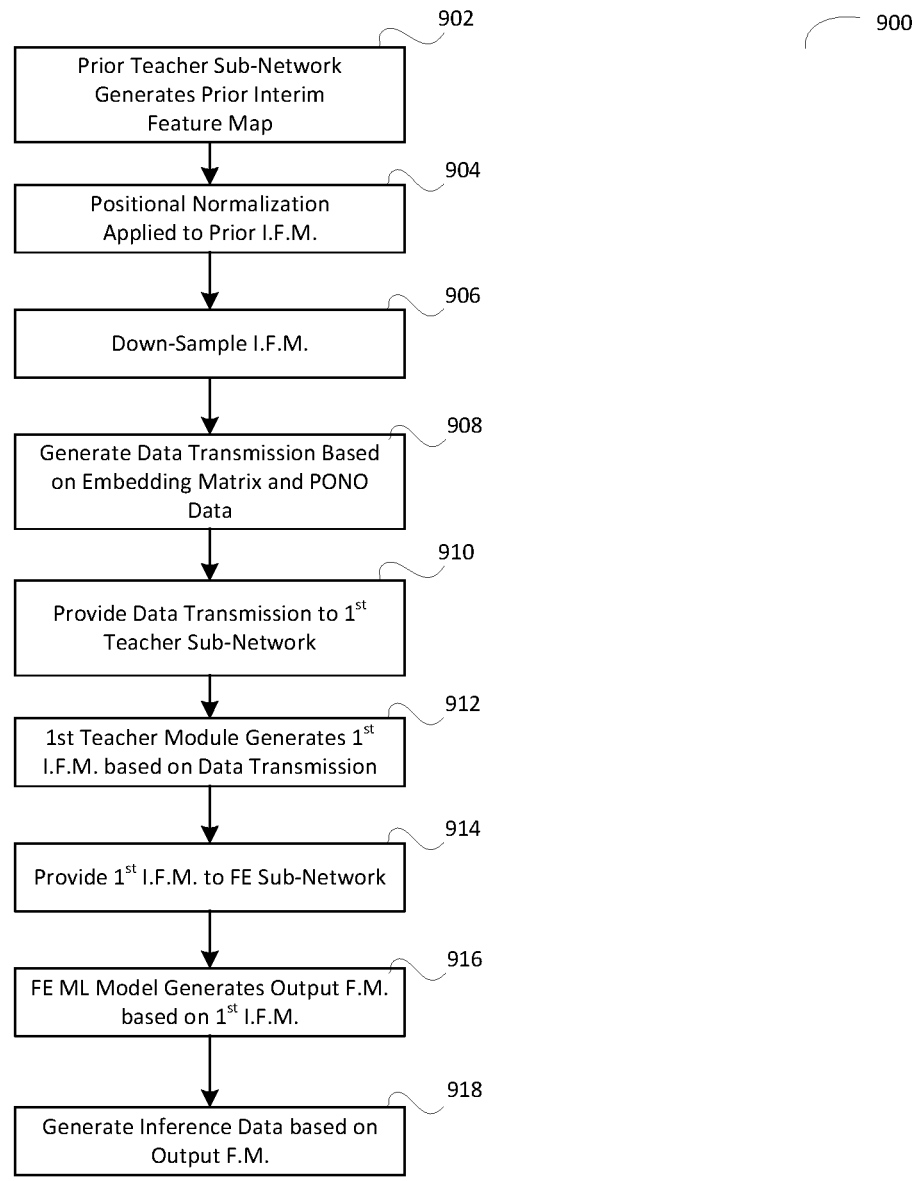
FIG. 9 is a flowchart of a second method of feature enhancement carried out by the feature enhancement block of FIG. 6 according to example embodiments described herein.

With reference to FIG. 9, a second method 900 for operating a portion of an integrated teacher-student machine learning model (e.g. third integrated system 301) in inference mode is shown. At step 902, a first processor (e.g. processor 702 of first device 402) is used to operate a prior teacher sub-network (e.g. initial teacher sub-network 302) in the inference mode to generate a prior intermediate feature map (e.g. intermediate feature map 1 340) based on the inference-mode data input (e.g. input 106).

At step 904, positional normalization data (e.g. PONO data 506) is generated based on the prior intermediate feature map.

At step 906, the prior intermediate feature map is down-sampled (e.g. by down-sampling and reshaping operation 512) to generate an embedding vector (e.g. embedding vector 514).

At step 908, compressed data (e.g. compressed data 412) is generated (e.g. by the compression block 308) based on the positional normalization data and the embedding vector.

At step 910, the compressed data is received at a second processor (e.g. processor 702 of second device 404), the second processor being used to operate a first teacher sub-network (e.g. second intermediate teacher sub-network 312) and a first student sub-network (e.g. third student sub-network 356) in the inference mode. The first student sub-network comprises a feature enhancement network (e.g. feature enhancement sub-network 600). The first student sub-network has been trained, operating in a training mode, using subsequent inference data (e.g. teacher inference data 108) provided as a supervision signal (e.g. teacher supervision signal 110), the subsequent inference data being generated by a subsequent sub-network of the integrated machine learning model (e.g. final teacher sub-network 316). The feature enhancement sub-network has been trained, operating in a training mode, to perform a non-linear mapping between its input and output using penultimate feature map data (e.g. penultimate feature map 360) provided by a subsequent teacher sub-network of the integrated machine learning model (e.g. final teacher sub-network 316) as a supervision signal.

At step 912, the first teacher sub-network is operated in the inference mode to generate a first intermediate feature map (e.g. intermediate feature map 3 344) based on the compressed data.

At step 914, the first intermediate feature map is provided to the feature enhancement sub-network as an input. The first intermediate feature map may comprise a first intermediate feature map matrix in some embodiments.

At step 916, the first student sub-network is operated in the inference mode to generate as output an output feature map matrix (e.g. output feature map matrix 610) based on the first intermediate feature map matrix, the output feature map matrix having different matrix dimensions than the first intermediate feature map matrix. The feature enhancement sub-network of the student sub-network generates the output feature map matrix by applying at least one convolution operation, at least one down-sampling operation, and at least one concatenation operation to the first intermediate feature map matrix, as described in the Feature Enhancement section above.

At step 918, student inference data (e.g. third student inference data 326) is generated data based on the output feature map matrix.

Figure 10:
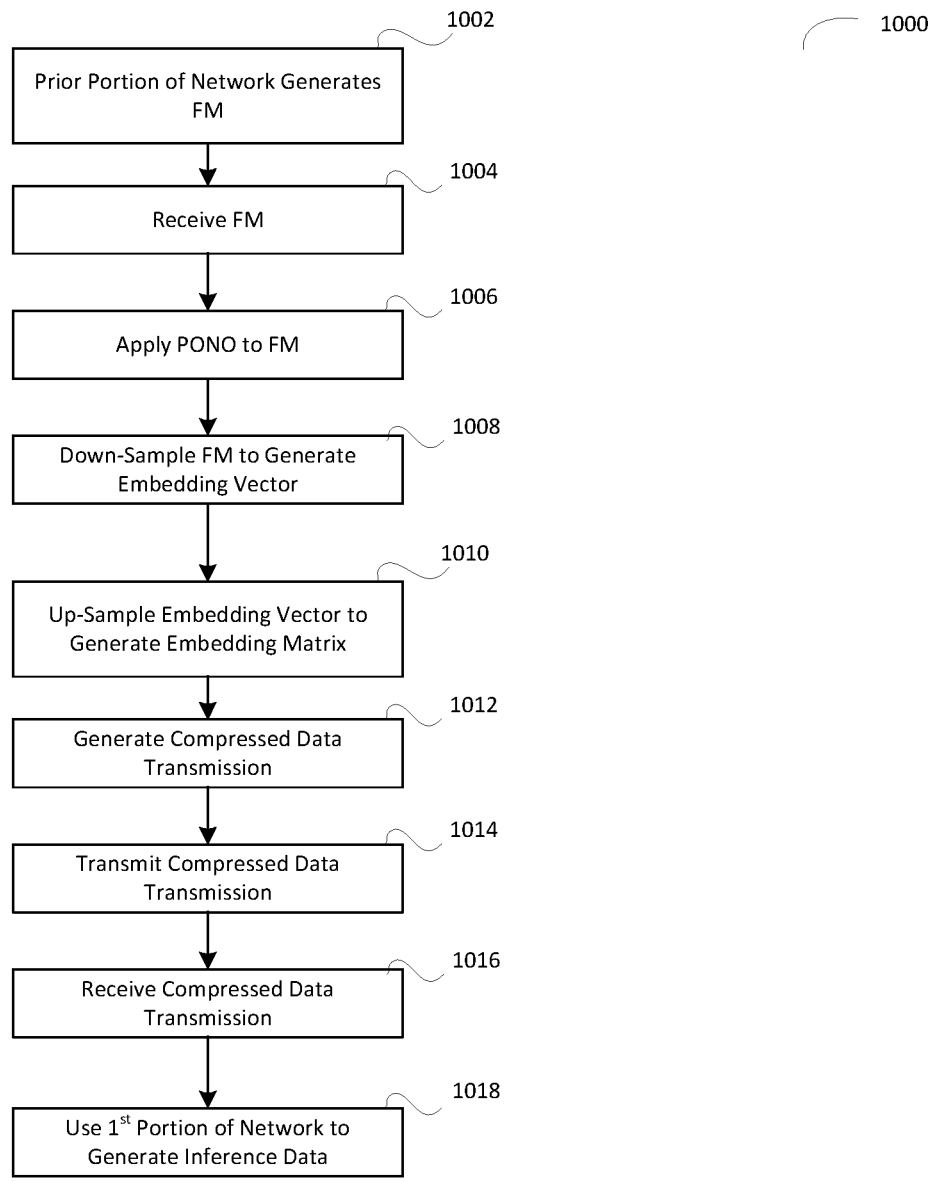
FIG. 10 is a flowchart of a third method of feature map compression carried out by the feature enhancement block of FIG. 6 according to example embodiments described herein.

With reference to FIG. 10, a third method 1000 for compressing feature map data used by a machine learning model (e.g. using compression block 308) is shown. At step 1002, a feature map (e.g. intermediate feature map 1 340) is generated by a first processor (e.g. processor 702 of first device 402), operating a prior teacher sub-network (e.g. initial teacher sub-network 302) of a machine learning model.

At step 1004, the feature map is received.

At step 1006, positional normalization data (e.g. PONO data 506) is generated based on the feature map.

At step 1008, down-sampling the feature map (e.g. by down-sampling and reshaping operation 512) to generate an embedding vector (e.g. embedding vector 514).

At step 1010, compressed data (e.g. compressed data 412) is generated comprising the positional normalization data and the embedding vector.

At step 1012, the compressed data is transmitted over a communication link (e.g. communication link 795).

At step 1014, the compressed data is received over the communication link at a second processor (e.g. processor 702 of second device 404).

At step 1016, the second processor is used to operate a first module of the machine learning model (e.g. fourth student sub-network 528 or final teacher sub-network 316) to generate inference data (e.g. fourth student inference data 328 or teacher inference data 108) based on the compressed data.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method, comprising:
   operating a first teacher sub-network of a teacher neural network of an integrated system in an inference mode to generate a first intermediate feature map based on an input data received by the integrated system; and operating a first student sub-network of the integrated system in the inference mode to generate student inference data based on the first intermediate feature map, wherein:

the first student sub-network has been trained when operating in a training mode, using subsequent inference data provided as a supervision signal, the subsequent inference data being generated by a second student sub-network of the integrated system that is trained using teacher inference data generated by the teacher neural network.

2. The method of claim 1, further comprising:

using a first processor to operate a prior teacher sub-network of the teacher neural network in the inference mode to:

generate a prior intermediate feature map based on the inference-mode data input; and provide compressed data based on the prior intermediate feature map; and receiving the compressed data at a second processor, the second processor being used to operate the first teacher sub-network and the first student sub-network in the inference mode.

3. The method of claim 2, wherein the compressed data is provided by:

generating positional normalization data based on the prior intermediate feature map;

down-sampling the prior intermediate feature map to generate an embedding vector; and generating the compressed data comprising the positional normalization data and the embedding vector.

4. The method of claim 1, wherein the first teacher sub-network comprises one or more layers of the teacher neural network.

5. The method of claim 1, wherein:

the first student sub-network comprises a feature enhancement sub-network; and the feature enhancement sub-network has been trained, operating in a training mode, to perform a non-linear mapping between its input and output using penultimate feature map data provided by a subsequent teacher sub-network of the integrated system as a supervision signal.

6. The method of claim 5, wherein:

the first intermediate feature map comprises a first intermediate feature map matrix; and generating student inference data comprises:

generating as output an output feature map matrix based on the first intermediate feature map matrix, the output feature map matrix having different matrix dimensions than the first intermediate feature map matrix; and generating student inference data based on the output feature map matrix.

7. The method of claim 6, wherein the feature enhancement sub-network generates the output feature map matrix by applying at least one convolution operation, at least one down-sampling operation, and at least one concatenation operation to the first intermediate feature map matrix.

8. A method, comprising:

receiving a feature map;

generating positional normalization data based on the feature map;

down-sampling the feature map to generate an embedding vector;

generating compressed data comprising the positional normalization data and the embedding vector; and transmitting the compressed data over a communication link.

9. The method of claim 8, wherein the feature map is generated by a first processor operating a prior sub-network of a neural network; and further comprising:

receiving the compressed data over the communication link at a second processor; and using the second processor to operate a first sub-network of the neural network to generate inference data based on the compressed data.

10. The method of claim 9, wherein:

the prior sub-network of the neural network comprises a first layer of the neural network; and the first sub-network of the neural network comprises a second layer of the neural network.

11. A method, comprising:

providing an integrated system comprising:

a teacher neural network comprising, in series:

a first teacher sub-network adapted to generate a first intermediate feature map based on a training-mode data input to the teacher neural network; and a final teacher sub-network adapted to generate teacher inference data based on the first intermediate feature map; and a first student sub-network adapted to generate first student inference data based on the first intermediate feature map; and training the integrated system by:

propagating the training-mode data input forward through the teacher neural network to generate the first intermediate feature map and teacher inference data;

propagating the first intermediate feature map forward through the first student sub-network to generate first student inference data;

calculating a first knowledge distillation loss based on a knowledge distillation loss function applied to the first student inference data and the teacher inference data; and propagating the first knowledge distillation loss backward through the first student sub-network and the first teacher sub-network to train the first student sub-network and the first teacher sub-network.

12. The method of claim 11, wherein:

the teacher neural network further comprises, in series prior to the first teacher sub-network, a prior teacher sub-network adapted to generate a prior intermediate feature map based on the training-mode data input;

the integrated system further comprises a prior student sub-network adapted to generate prior student inference data based on the prior intermediate feature map; and training the integrated system further comprises:

propagating the prior intermediate feature map forward through the prior student sub-network to generate prior student inference data;

calculating a prior knowledge distillation loss based on a knowledge distillation loss function applied to the prior student inference data and the first student inference data; and propagating the prior knowledge distillation loss backward through the prior student sub-network and the prior teacher sub-network to train the prior student sub-network and the prior teacher sub-network.

13. The method of claim 11, further comprising, after the teacher neural network and the first student sub-network have been trained, jointly operating the first teacher sub-network and the first student sub-network in an inference mode to perform an inference task.

14. The method of claim 11, wherein the final teacher sub-network is further adapted to generate a penultimate feature map based on the first intermediate feature map, the method further comprising:
   providing a first feature enhancement sub-network as part of the first student sub-network; and
   training the first feature enhancement sub-network by:
      propagating the first intermediate feature map forward through the first feature enhancement sub-network to generate a first student feature map;
      calculating a feature enhancement loss based on the penultimate feature map compared to the first student feature map; and
      propagating the feature enhancement loss backward through the first feature enhancement sub-network to train the first feature enhancement sub-network.

15. The method of claim 11, further comprising, before training the integrated system, pre-training the teacher neural network.

16. A device, comprising:
   a processor; and
   a memory having stored thereon instructions for carrying out the steps of the method of claim 1.

17. A device, comprising:
   a processor;
   a communication link; and
   a memory having stored thereon instructions for carrying out the steps of the method of claim 8.

18. A non-transitory processor-readable medium containing instructions for executing the method of claim 1.

19. A non-transitory processor-readable medium containing instructions for executing the method of claim 8.

20. A non-transitory processor-readable medium containing instructions for executing the method of claim 11.

* * * * *